United States Patent
Weiss et al.

(10) Patent No.: US 10,974,216 B2
(45) Date of Patent: Apr. 13, 2021

(54) DEVICE AND METHOD FOR THE REMOVAL OF POLYCRYSTALLINE SILICON RODS FROM A REACTOR

(71) Applicant: Wacker Chemie AG, Munich (DE)

(72) Inventors: Tobias Weiss, Mehring (DE); Udo Almasy, Tann (AT); Stefan Faerber, Tuessling (DE); Reiner Pech, Neuoetting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 16/743,780

(22) Filed: Jan. 15, 2020

(65) Prior Publication Data
US 2020/0147569 A1 May 14, 2020

Related U.S. Application Data

(62) Division of application No. 14/782,865, filed as application No. PCT/EP2014/055604 on Mar. 20, 2014, now Pat. No. 10,576,436.

(30) Foreign Application Priority Data
Apr. 10, 2013 (DE) .................. 10 2013 206 339.3

(51) Int. Cl.
*B01J 4/00* (2006.01)
*C01B 33/035* (2006.01)
*B66F 19/00* (2006.01)

(52) U.S. Cl.
CPC .............. *B01J 4/001* (2013.01); *B66F 19/00* (2013.01); *C01B 33/035* (2013.01)

(58) Field of Classification Search
CPC .. H01L 21/76254; H01J 37/3244; B66C 3/02; B66C 1/46; C01B 33/035; B66F 11/00; B66F 19/00; C23C 16/24; C23C 16/4418; B65G 11/126; B65G 69/0441; B65G 67/24; B65G 43/08; B05C 15/00; B01J 4/001
USPC .................. 294/19.1, 19.2, 119.3; 376/100
See application file for complete search history.

(56) References Cited

U.S. PATENT DOCUMENTS

| | | | |
|---|---|---|---|
| 4,805,556 A * | 2/1989 | Hagan .................. | C01B 33/035 118/725 |
| 4,848,587 A | 7/1989 | Nipp | |
| 5,382,419 A | 1/1995 | Nagai et al. | |
| 6,354,643 B1 | 3/2002 | Podejko | |
| 8,402,599 B2 * | 3/2013 | Charlton ............... | A47L 9/1683 15/352 |

(Continued)

FOREIGN PATENT DOCUMENTS

| CN | 101495682 A | 7/2009 |
|---|---|---|
| CN | 104066677 A | 9/2014 |

(Continued)

OTHER PUBLICATIONS

Shravan Kumar Chunduri, "Innovations in inertia", Apr. 2, 2013, Photon International, Apr. 2013.

*Primary Examiner* — Stephen A Vu
(74) *Attorney, Agent, or Firm* — Brooks Kushman P.C.

(57) ABSTRACT

A device for removing polycrystalline silicon rod pairs from a Siemens reactor has a body dimensioned to fit over a single rod pair. Once the rod pair is within the body, the body and enclosed rod pair is removed.

15 Claims, 1 Drawing Sheet

(56) References Cited

U.S. PATENT DOCUMENTS

| | | | |
|---|---|---|---|
| 8,703,248 B2* | 4/2014 | Endoh | C01B 33/035 427/543 |
| 2009/0056279 A1* | 3/2009 | Sasaki | B65D 31/08 53/449 |
| 2009/0165704 A1* | 7/2009 | Tebakari | C23C 16/02 117/101 |
| 2010/0001106 A1 | 1/2010 | Schaefer et al. | |
| 2010/0041215 A1 | 2/2010 | Kim et al. | |
| 2010/0043972 A1 | 2/2010 | Baldi et al. | |
| 2010/0215562 A1 | 8/2010 | Sanchez et al. | |
| 2010/0270371 A1 | 10/2010 | Kieling et al. | |
| 2011/0070439 A1 | 3/2011 | Sofin | |
| 2011/0229717 A1 | 9/2011 | Kraus | |
| 2012/0060562 A1 | 3/2012 | Wochner et al. | |
| 2012/0175613 A1 | 7/2012 | Netsu et al. | |
| 2012/0237678 A1* | 9/2012 | Bovo | C01B 33/035 427/248.1 |
| 2012/0270167 A1* | 10/2012 | Sato | C30B 15/10 432/13 |
| 2013/0269295 A1 | 10/2013 | Mattes et al. | |
| 2013/0309524 A1 | 11/2013 | Vietz et al. | |
| 2015/0003952 A1 | 1/2015 | Kurosawa et al. | |

FOREIGN PATENT DOCUMENTS

| | | |
|---|---|---|
| DE | 102007027110 A1 | 12/2008 |
| DE | 102009027830 B3 | 1/2011 |
| DE | 102012208473 A1 | 11/2013 |
| EP | 2810919 A1 | 10/2014 |
| JP | S63296840 A | 12/1988 |
| JP | 2002210355 A | 7/2002 |
| JP | 2012021015 | 2/2012 |
| JP | 2013159504 A | 8/2013 |

\* cited by examiner

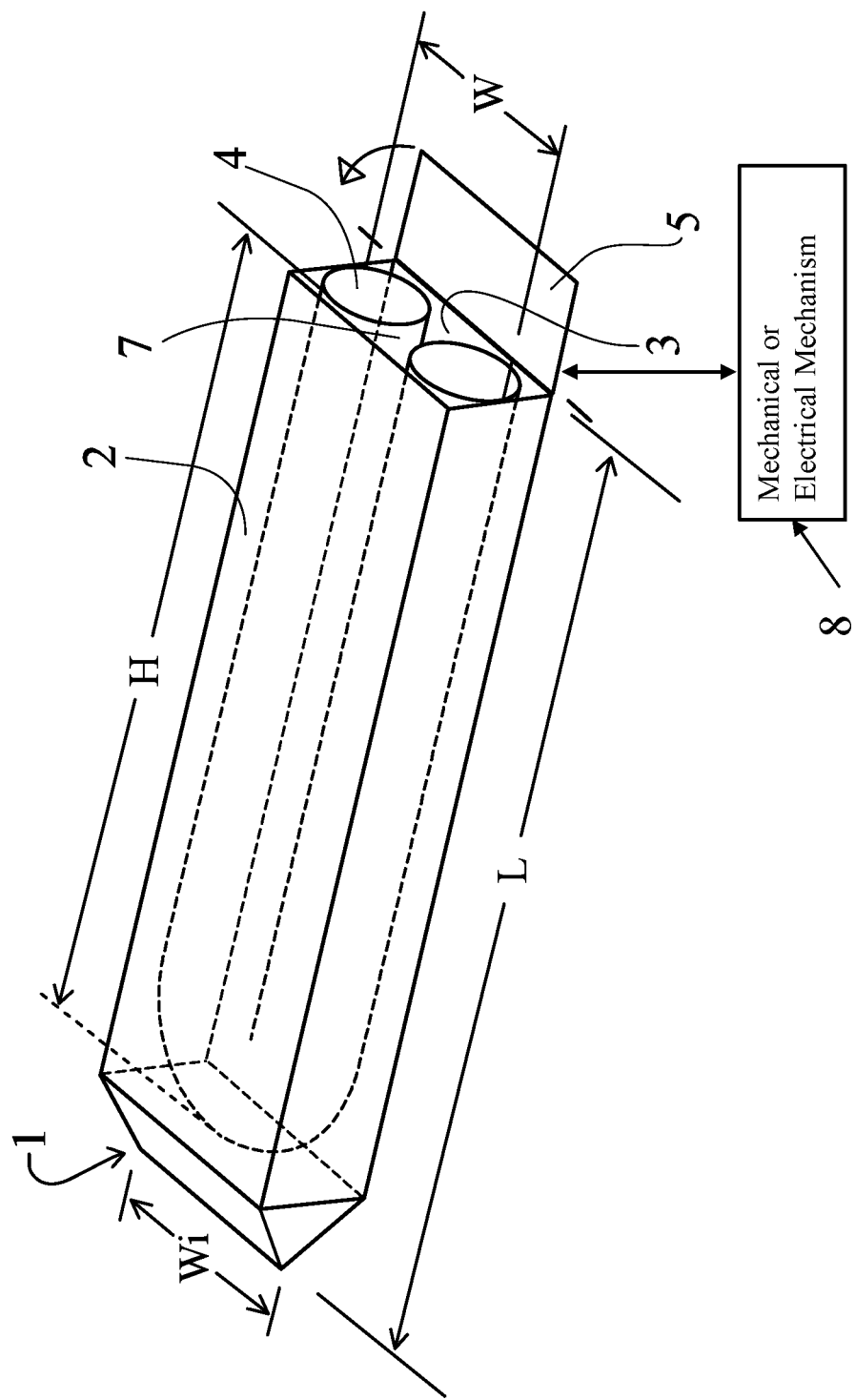

DEVICE AND METHOD FOR THE REMOVAL OF POLYCRYSTALLINE SILICON RODS FROM A REACTOR

CROSS-REFERENCE TO RELATED APPLICATIONS

This application is a division of U.S. application Ser. No. 14/782,865 filed Oct. 7, 2015, now U.S. Pat. No. 10,576,436 B2, which is the U.S. National Phase of PCT Appln. No. PCT/EP2014/055604 filed Mar. 20, 2014, which claims priority to German Application No. 10 2013 206 339.3 filed Apr. 10, 2013, the disclosures of which are incorporated in their entirety by reference herein.

TECHNICAL FIELD

The invention relates to a device and a method for the removal of polycrystalline silicon rods from a reactor.

BACKGROUND

High-purity polycrystalline silicon (polysilicon) serves as a starting material for producing monocrystalline silicon for semiconductors by the Czochralski (CZ)—or zone melting (ZM)-method, and also for producing monocrystalline or polycrystalline silicon by various drawing and casting methods for producing solar cells for photovoltaics.

Polysilicon is usually produced by the Siemens process, which is a process whereby a reaction gas comprising one or more silicon-containing components and optionally hydrogen is introduced into a reactor comprising substrates heated by direct passage of current, wherein silicon deposits in solid form onto the substrates. The silicon-containing components are preferably silane ($SiH_4$), monochlorosilane ($SiH_3Cl$), dichlorosilane ($SiH_2Cl_2$), trichlorosilane ($SiHCl_3$), tetrachlorosilane ($SiCl_4$), or mixtures of these substances.

The Siemens process for depositing silicon in solid form onto substrates, is usually carried out in a deposition reactor (also termed a "Siemens reactor"). In the most common embodiment, the reactor comprises a metallic base plate and a coolable bell which is seated on the base plate in such a manner that a reaction space is formed in the interior of the bell. The base plate is furnished with one or more gas inlet openings and one or more off-gas openings for the departing reaction gases, and also with holders with which the substrates are held within the reaction space and are supplied with electric power.

Each substrate consists usually of two thin filament rods and a bridge which joins the generally adjacent rods at their free ends. The filament rods plug vertically into the electrode situated on the reactor base, via which electrodes the connection to the power supply is made. On the heated filament rods and the horizontal bridge, high-purity polysilicon deposits, as a result of which the diameter thereof increases with time. After the desired diameter is achieved, the process is terminated.

In this method, U-shaped silicon rods are obtained which can be several meters high and can weigh several 100 kg. For a process which is as economical as possible, it is necessary to deposit to maximum rod diameters.

The removal of very large and heavy rods from the reactor is a problem. The removal should proceed with as low contamination as possible and as economically as possible, namely should be associated with a minimum idle time of the reactor. It should also be possible to remove inclined, unevenly shaped rods (e.g. elliptical or club-shaped rods, that is to say with rods with varying rod diameter over the rod height) or rods that touch each other safely.

US 20120237678 A1 discloses a device for the removal of polycrystalline silicon rods, comprising a body having outer walls which is dimensioned in such a manner that the rods are enclosed by the outer walls, wherein each outer wall contains a door in order to permit access to at least one of the rods. In a preferred embodiment, the inner walls are lined with a polymer in order to prevent contamination of the polycrystalline silicon rods.

US 20100043972 A1 discloses a further device for the removal of polycrystalline silicon rods, comprising a wall having an inner wall, an outer wall and a multiplicity of connections between inner wall and outer wall, and a gap between inner wall and outer wall, an access window in the outer wall, a baseplate, and a multiplicity of contacts on the baseplate, wherein the inner wall and outer wall are cylindrical and concentric, the gap is dimensioned in order to receive a multiplicity of silicon rods situated on the contacts of the baseplate, wherein the access window is made such that access to the silicon rods is made possible. The rods can be withdrawn via the access window.

It is disadvantageous of the devices described above, that in the case of rods standing at an incline, or in the event of a partially dropped batch, which occurs not infrequently, use thereof is impossible. Therefore, this device is not very practical for economic production of polysilicon.

This also applies to the method claimed in DE 10 2009 027 830 B3 for withdrawal of polycrystalline silicon rods from a reactor, wherein a rigid and automated guidance with a computer-controlled recognition method based on calibration points is operated over the open reactor and the rod pairs are gripped by means of mechanical or pneumatic clamping device and these are then deposited into a transport device.

JP 63296840 A discloses a device for the removal of silicon rods from a deposition reactor, in which a single rod pair is fixed using clamps and is lifted out from the reactor at the side.

JP 2002210355 A likewise discloses a device for the removal of silicon rods, comprising an arm movable in three dimensions, at the end of which a clamping device is mounted with which the silicon rods can be lifted out of the reactor.

It is disadvantageous in these two devices that the rods can only be withdrawn from the outside inwards from the completely open reactor. A targeted removal of a defined silicon rod, e.g. from an internal rod circle, which is sometimes desirable, is impossible using the described device.

US 20120175613 A1 discloses a method for producing a polycrystalline silicon piece, consisting of a CVD process for producing a polycrystalline silicon rod by deposition of silicon on a filament wire, one end of which is connected to a first electrode, and the other end of which is connected to a second electrode, a process for withdrawal of the polycrystalline silicon rod from the reactor, and a comminution process of the silicon rod into silicon pieces, wherein, before the comminution process, at least 70 mm are removed from the electrode end of the polycrystalline silicon rod (foot shortening process). In a preferred embodiment, the surface of the polycrystalline silicon rod, before removal from the reactor, is covered with a bag-like piece of polyethylene. The withdrawal itself can proceed by means of a crane or the like. With respect to the above described problems in removal of the rods by means of known devices, US 20120175613 A1 leaves no indications of a solution or suggestions.

It would be desirable to provide a rod removal device which solves the problems described above.

SUMMARY

The invention relates to a device for the removal of polycrystalline silicon rods from a reactor containing U-shaped rod pairs, comprising a body having an outer wall (2) and an inner wall (3) which is dimensioned such that it can completely enclose a U-shaped rod pair, wherein the body having the U-shaped rod pair enclosed thereby interacts with a crane, a cable hoist or a gripper in such a manner that the body can be removed from the reactor together with the U-shaped rod pair. It has been found that the use of such a device is without consequence to other rod pairs in the reactor.

The invention also relates to a method for the removal of polycrystalline silicon rods from a reactor, wherein the reactor comprises U-shaped rod pairs, wherein one of the U-shaped rod pairs is completely enclosed by a body having an outer wall and an inner wall, and the body together with the rod pair enclosed thereby is removed from the reactor by means of a crane, a cable hoist or a gripper.

BRIEF DESCRIPTION OF THE DRAWINGS

FIG. 1 illustrates one embodiment of a device of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The body (1) is preferably dimensioned in such a manner that the length (L) thereof corresponds to at least the height (H) of the vertical rod pair (4). Preferably, the length is at least 2.5 m.

The width (Wi) of the body is preferably at least the width (W) of a U shaped silicon rod pair (silicon bridge+rod diameter). Preferably, the width is at least 200 mm, more preferably at least 300 mm.

It has been found that a particularly safe and low-contamination removal of the silicon rods can be ensured when the body is configured with respect to the maximum width and depth thereof in such a manner that the distance from the adjacent rod pairs is a minimum of 1 cm. As a result, even rods that have grown crooked or highly club-shaped can be removed.

The removal of unstable polysilicon rods (e.g. having a high popcorn fraction, that is to say high surface roughness, or instability due to jumps on the silicon rod) is possible without problems. In particular, there is no danger that the total batch or individual rod pairs could fall down during the removal process.

Since rod removal proceeds pairwise, each silicon rod pair can be removed at any desired point in time. In particular, removal from the interior outwards is possible, which was not provided for with devices of the prior art. A targeted removal of a defined rod pair thus does not pose any difficulties.

Preferably, the body has an inner wall (3) made of steel. The inner wall of the body can be coated with a polymer. Preferably, the body consists of steel, that is to say comprises a steel shell.

Particular preference is given to an embodiment which provides a body having an uncoated steel inner wall, wherein the silicon rod pair is covered during removal with a plastic bag. This embodiment is particularly space-saving when the steel wall is as thin as possible. Coating the steel inner wall is not required in this case, since the plastic bag protects the silicon against contamination.

As an alternative to the uncoated steel wall in combination with a plastic bag, particular preference is also given to an embodiment of the body comprising a low-contamination hard metal (e.g. tungsten carbide, TiN or others) or otherwise, a low-abrasion ceramic.

Preference is also given to the use of a body containing a steel inner wall, wherein the inner wall of the body is partially or completely coated with such a low-contamination hard metal, or with a low-abrasion ceramic.

It is likewise preferred that the body consists of a flexible, but stable, plastic. Possible plastics here are a fiber composite plastic made of an aromatic polyamide (aramid fibers) or of a polyester such as polycarbonate or polyethylene terephthalate. Equally, materials of carbon or carbon components or glass fiber-reinforced plastics (GRP) are possible.

The silicon rod pair itself can be lifted out with the aid of a crane device, a cable hoist, or comparable systems.

Preferably, the body comprises at an opening (7) of the body a flap (5) which is closable manually or by means of a mechanical or electrical mechanism (8), in such a manner that the U-shaped rod pair may be enclosed completely in the body and thus may be lifted out of the reactor. The rod pair that has been lifted out is transported away to further processing operations preferably by means of a transport truck.

The use of grippers is also possible in order to remove the rods pairwise from the reactor. The grippers are preferably dimensioned in such a manner that they have a radius as small as possible and, even in the case of closely arranged rods in the reactor, still permit safe fixing of the rod pairs. A low-contamination and safe removal of the rod pairs by means of such grippers does not pose any difficulties. However, when such grippers are used, there is the disadvantage that, as in some solutions of the prior art, it is only possible to remove the rods from the outside towards the inside.

The invention permits the removal of very large silicon rods from a reactor without damaging or contaminating them.

By means of the invention it is possible to deposit the maximum rod diameter. The maximum possible rod diameter depends solely on the arrangement of the rods in the reactor and on the deposition process. To date, the deposition of rods having the maximum possible rod diameter was not possible, because there was no known possibility of removing such rods in a safe and low-contamination manner.

Also, inclined or club-shaped rods, likewise rods having high surface roughness or rods deposited in an unstable manner (having increased porosity), or mutually touching rods, can be removed without difficulties.

The invention may display its advantages, particularly, when the rods in the reactor are arranged particularly close.

The closeness in the reactor may be defined as the ratio of maximum silicon rod cross section of a batch divided by the area spanned by the reactor internal diameter. At a ratio between 0.2 and 0.5, it is not possible to remove rods pairwise by the known prior art. The devices according to US 20120237678 A1 and US 20100043972 A1, in contrast to the present invention, do not permit individual pairwise removal of very thick rods (closeness 0.2-0.5), since position and size of the rods are greatly restricted by the predetermined chambers in the removal system. If the rod diameters increase beyond the possible closeness factor (even if only for a few rod pairs in the entire reactor), both removal systems can no longer be used for removing the rods, since the excessively thick or inclined rods do not fit into the chambers provided therefor. In this case, attempts must be made by hand to remove the rods individually. This is very time-consuming, causes increased contamination of the silicon, and in addition is hazardous for the personnel (rods can drop down). In the worst case, the entire batch must be intentionally discarded.

The present invention provides that the rod removal proceeds pairwise, and the deposition reactor comprises an even number of rods. Preferably, the number of rods is at least 24. The rods preferably have a diameter of at least 145 mm.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for the removal of polycrystalline silicon rods from a reactor containing U-shaped rod pairs, comprising a body having an outer wall, an inner wall which is dimensioned such that it can completely enclose one U-shaped rod pair, an opening at a lower end thereof, and a closable flap to close said opening and minimize contamination wherein the body having the U-shaped rod pair is capable of being lifted in such a manner that the body together with the one U-shaped rod pair can be removed from the reactor, wherein the body is dimensioned such that a length thereof corresponds to at least a height of the one U-shaped rod pair and an internal width thereof corresponds to at least a width of the one U shaped rod pair.

2. The device of claim 1, wherein the body has an inner wall made of steel and the rod pair is covered with a plastic bag prior to enclosure with the body.

3. The device of claim 1, wherein the body is made of a low-contamination hard metal, or is made of a plastic.

4. The device of claim 1, wherein the body has an inner wall made of steel which is coated with a plastic.

5. The device of claim 1, wherein the body has an inner wall made of steel which is partially or completely coated with a low-contamination hard metal.

6. The device of claim 1, wherein the body is a flexible body made up of a plastic material.

7. The device of claim 1, wherein the body walls are sized such that the body may enclose rods in a Siemens reactor having a closeness ratio of from 0.2 to 0.5.

8. The device of claim 7, wherein the body has walls of steel coated with plastic such that a rod pair enclosed within the body can directly contact each wall without contamination.

9. The device of claim 1 further comprising a mechanical or electrical mechanism to close the flap.

10. The device of claim 1, further comprising one U-shaped rod pair enclosed within the body and the closable flap.

11. The device of claim 10 wherein the one U-shaped rod pair includes a pair of rods connected by a bridge spaced apart from a pair of terminal ends.

12. The device of claim 11 wherein the pair of terminal ends of the one U-shaped rod pair are oriented adjacent to the opening of the body.

13. A device for the removal of polycrystalline silicon rods from a reactor containing U-shaped rod pairs, comprising:
a body having an outer wall, an inner wall which is dimensioned such that it can completely enclose one U-shaped rod pair, an opening at a lower end thereof;
a closable flap to close said opening and minimize contamination;
wherein the body having the U-shaped rod pair is capable of being lifted in such a manner that the body together with the one U-shaped rod pair can be removed from the reactor;
wherein the body is dimensioned such that a length thereof corresponds to at least a height of the one U-shaped rod pair and an internal width thereof corresponds to at least a width of the one U shaped rod pair;
wherein the body walls are sized such that the body may enclose rods in a Siemens reactor having a closeness ratio of from 0.2 to 0.5;
a mechanical or electrical mechanism to close the flap; and
a U-shaped rod pair enclosed within the body and the closable flap.

14. The device of claim 13 wherein the one U-shaped rod pair includes a pair of rods connected by a bridge spaced apart from a pair of terminal ends.

15. The device of claim 14 wherein the pair of terminal ends of the one U-shaped rod pair are oriented adjacent to the opening of the body.

* * * * *